Dec. 10, 1968 G. W. EBERT 3,415,499
ASPHALT PREPARING AND DELIVERING SYSTEM
Filed June 2, 1967 4 Sheets-Sheet 2
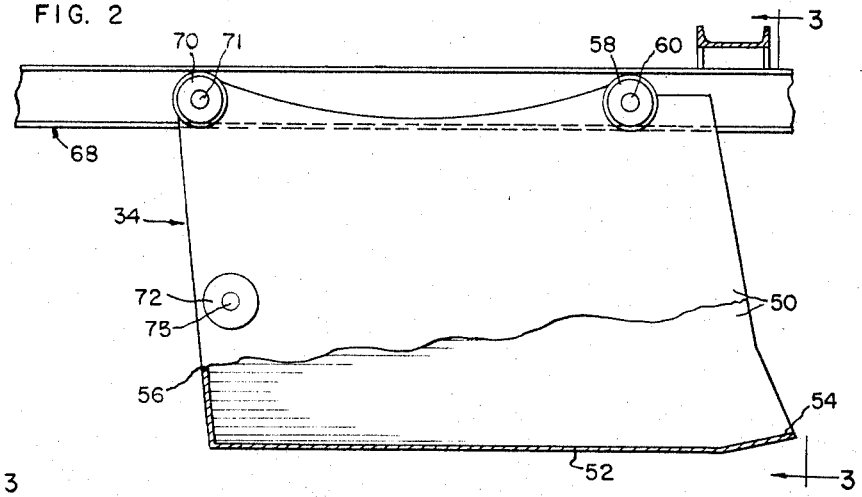
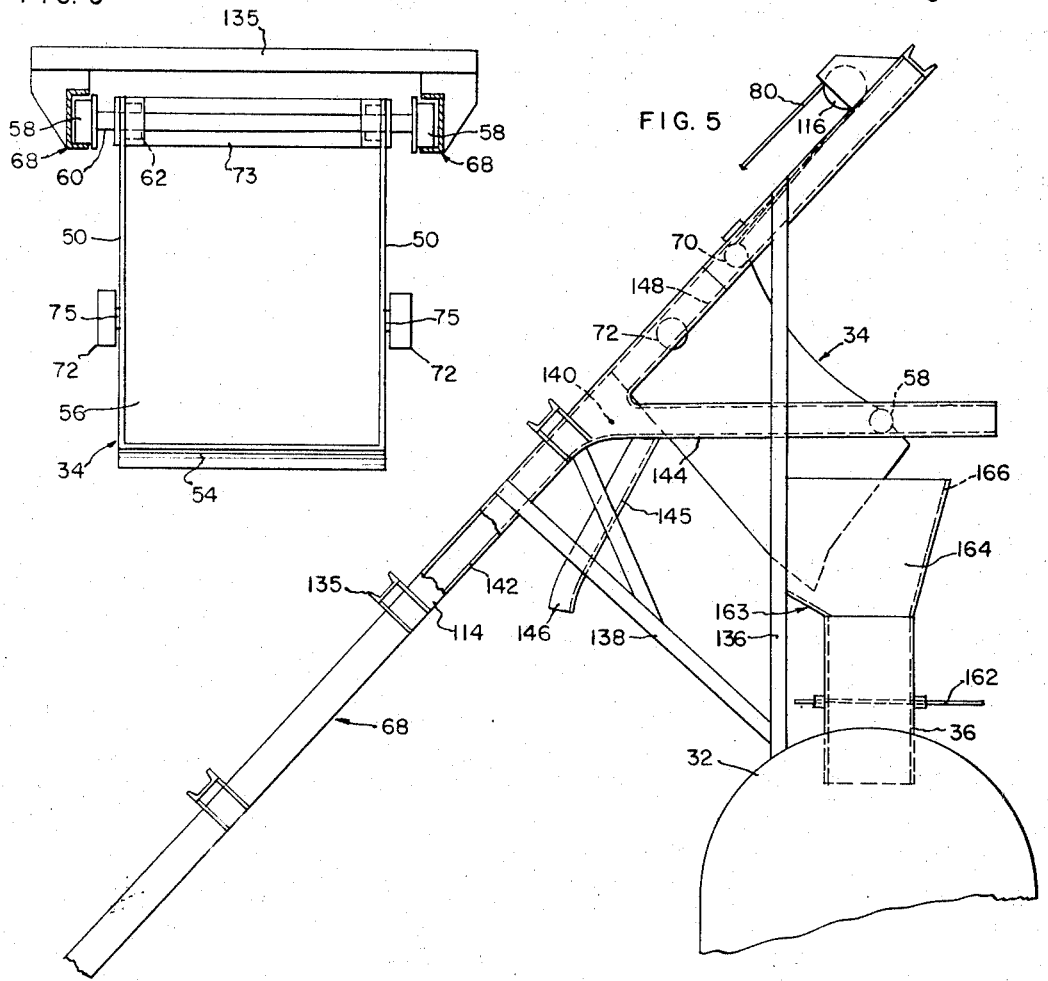
GLENN W. EBERT
INVENTOR
BY
BUCKHORN, BLORE, KLARQUIST & SPARKMAN
ATTORNEYS

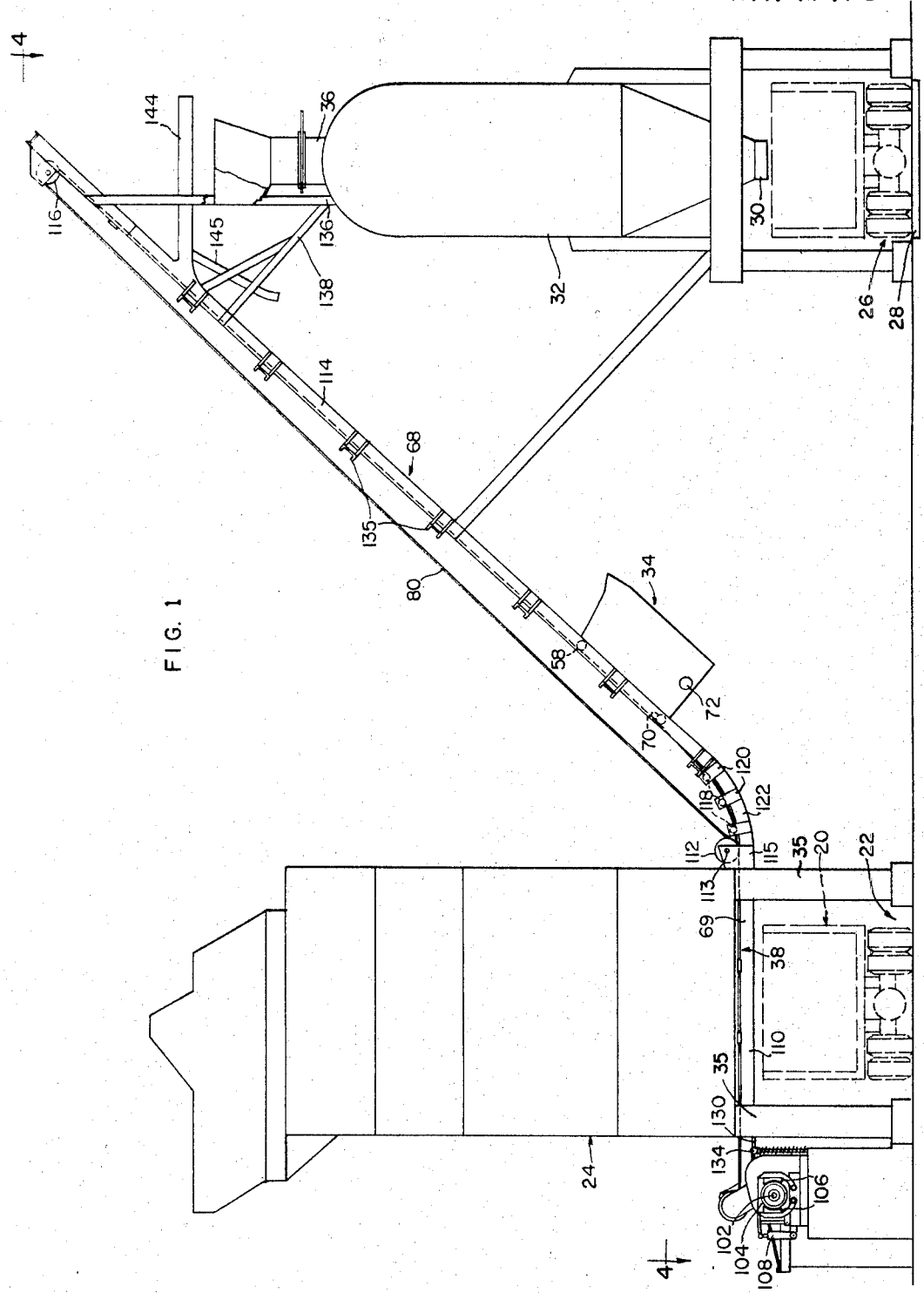

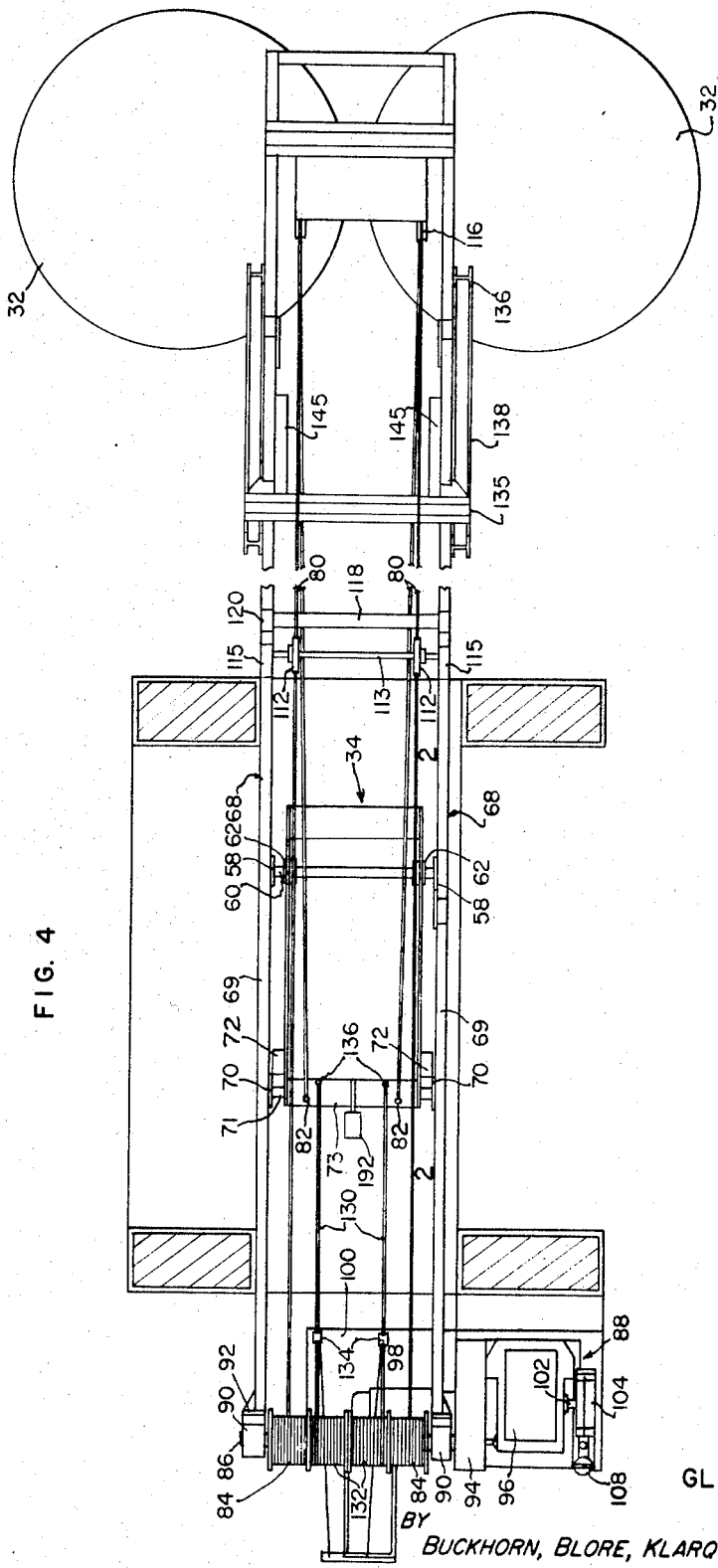

GLENN W. EBERT
INVENTOR
BY
BUCKHORN, BLORE, KLARQUIST & SPARKMAN
ATTORNEYS

United States Patent Office 3,415,499
Patented Dec. 10, 1968

3,415,499
ASPHALT PREPARING AND
DELIVERING SYSTEM
Glenn W. Ebert, Eugene, Oreg., assignor to McKenzie
Sand & Gravel Co., Eugene, Oreg., a corporation of
Oregon
Filed June 2, 1967, Ser. No. 643,212
15 Claims. (Cl. 259—171)

ABSTRACT OF THE DISCLOSURE

Asphalt mixtures are formulated in an elevated mixing plant. Standard mixtures are dumped from the plant into a skip which delivers them to large capacity, elevated surge tanks which dump weighed loads into trucks. The plant dumps special mixtures directly into trucks therebelow. Thus, the plant can normally be operated to build up reserve quantities of standard mixtures while providing quick delivery of special mixtures. The skip is carried by front and rear rollers which travel along elevating tracks, and, when the skip nears its dumping position, the front rollers travel through gaps in the tracks and onto branch, dumping tracks, the bridging rollers travel along bridging tracks as the rear rollers approach the gaps in the elevating tracks and support the rear end of the skip as the rear rollers travel over the gaps and into upper portions of the elevating tracks, and further travel of the rear rollers up the upper portions of the elevating tracks while the front rollers travel horizontally tilts the skip to discharge it. The skip is moved by two advancing cables and two haulback cables, the cables being driven by drums driven by two parallel chains of a drive having a brake drum against which two brake shoes are normally biased. The drive includes an electric motor and a dynamic braking circuit actuates the motor to brake the cable drive to provide additional braking to that of the brake shoes.

---

This invention relates to an asphalt preparing and delivering system, and more particularly to a high capacity, flexible asphalt formulating system.

An object of the invention is to provide a new and improved asphalt preparing and delivering system.

Another object of the invention is to provide a high capacity, flexible asphalt preparing and delivering system.

A further object of the invention is to provide an asphalt preparing and delivering system in which an asphalt plant dumps selectively either into a truck at a loading station therebelow or into a skip which carries the mixture to surge tanks which are adapted to dump into trucks positioned therebelow.

Another object of the invention is to provide an asphalt preparing and delivering system in which a formulating and mixing plant normally mixes and delivers standard mixtures to a skip which carries the mixtures to storage tanks adapted to load trucks and in which the formulating and mixing plant is adapted to formulate and mix a special mixture on demand and dump the special mixture directly into a truck without any interruption of delivery of the standard mixtures from the tanks to trucks wishing loads of the standard mixtures.

Another object of the invention is to provide a simple, effective skip dumping system in which front and rear rollers supporting a skip travel along elevating tracks to a dumping station at which point the front rollers pass through gaps in the tracks onto horizontal tracks, after which bridging rollers support the rear end of the skip while the rear rollers travel over the gaps onto upper portions of the elevating tracks and, on further advance of the skip, the skip is tilted to discharge its contents.

A further object of the invention is to provide a safe skip conveyor system in which a skip is moved in a delivery direction by two elevating cables, and is returned by two haulback cables, the cables are driven by drums on a shaft driven by an electric motor through a drive having two parallel chains and braked by a pair of brake shoes and a dynamic braking circuit supplying braking current to the motor.

The invention provides an asphalt preparing and delivering system in which an elevated formulating and mixing plant normally is operated to formulate and mix one of a plurality of standard asphalt mixtures and dump the standard asphalt mix into a skip which delivers it to one of a plurality of surge tanks which is adapted to store a large quantity of, and deliver a load of that mixture to a truck needing that mixture. When a truck needing a special mixture arrives, the skip is kept out from under the plant and the truck is driven under the plant to a position adapted to receive material from the plant, and the plant is operated to formulate, mix and dump the special mixture directly into the truck thereunder. Preferably the skip is underslung and supported by front and rear pairs of rollers traveling in a pair of inclined elevating tracks extending from the plant to above the surge tanks. As the skip approaches its dumping position, the front rollers pass through gaps in the inclined elevating tracks and travel along horizontal branch tracks. Then, before the rear rollers reach the gaps, a pair of bridging rollers at the rear of the skip engage bridging tracks generally paralleling the elevating tracks, and the bridging rollers engage the bridging tracks and support the rear end of the skip as the rear rollers arrive at the gaps and in further forward movement of the skip, the rear end of the skip is lifted to tilt the skip to discharge its contents. Preferably the skip is advanced from the plant to the surge tanks by a pair of elevating cables, is returned to the plant by a pair of haulback cables, and movement of the cables is controlled by drums on a shaft driven by a drive including a reversible electric motor which is slowed by a dynamic braking circuit. The drive preferably has two parallel drive chains and has a brake drum braked by two brake shoes which are normally urged toward their braking positions.

A complete understanding of the invention may be obtained from the following detailed description of an asphalt preparing and delivering system forming a specific embodiment thereof, when read in conjuction with the appended drawings, in which:

FIG. 1 is a fragmentary elevation view of an asphalt preparing and delivery system forming one embodiment of the invention;

FIG. 2 is an enlarged, fragmentary elevation view of a portion of the system of FIG. 1;

FIG. 3 is a vertical sectional view taken along line 3—3 of FIG. 2;

FIG. 4 is a sectional view taken along line 4—4 of FIG. 1;

FIG. 5 is an enlarged, fragmentary elevation view of a portion of the system of FIG. 1.

Figure 6:
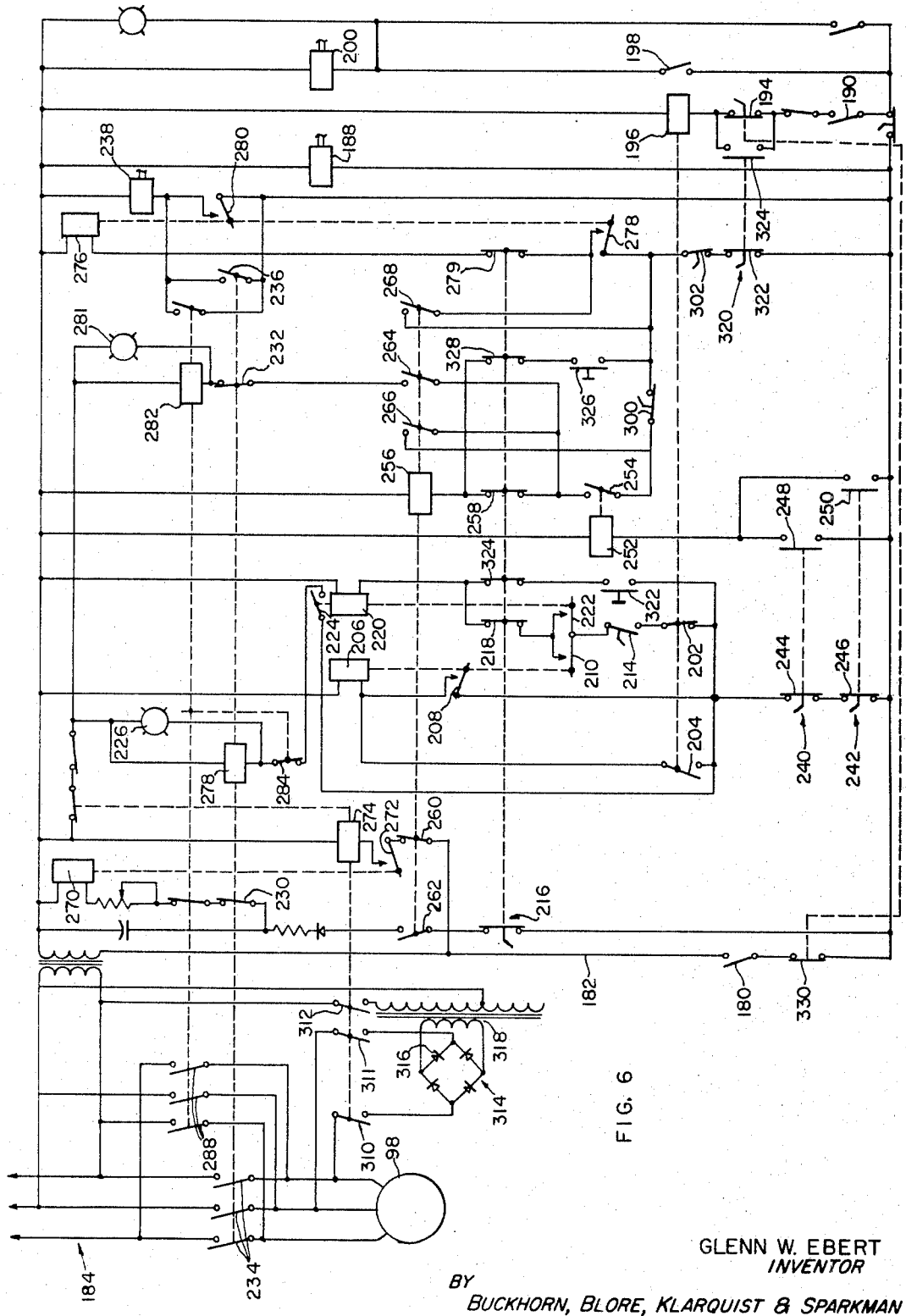
FIG. 6 is a diagrammatic view of a control circuit of the system of FIG. 1.

Referring now in detail to the drawings, there is shown therein an asphalt preparing and delivering system for loading any of several different asphalt mixtures promptly to a truck 20 at a plant station 22 at a formulating, weighing and mixing plant 24 of known construction from a pug mill gate at the bottom thereof or at a surge tank station 26 located at a scale 28 below delivery spouts 30 of insulated surge tanks 32 serving to store multi-load quantities of different asphalt mixtures supplied thereto from the plant 24 by an underslung skip 34. The plant 24 is supported in an elevated, truck-clearing position by posts 35. The plant 24 has a maximum capacity to formulate a batch of only a fraction, one-third or one-half, for example, of the load of the average capacity truck and each surge tank 32 normally holds a quantity several times as great as that load. As a result, the plant 24 is operated, during intervals when no truck requiring a special mixture needs loading, to repeatedly formulate and mix either the heavy running or standard mixture of one of the tanks 32 or the second heavy running or standard mixture of the other tank 32, each batch from the plant being delivered to the desired surge tank 32 by the skip 34 and a two-position dump chute 36 to keep multi-load supplies of the two standard mixtures in the surge tanks. Then, when a truck needing a different mixture arrives, the plant 24, after delivering its last batch of one of the two standard mixtures to the skip 34, is operated to formulate, weigh and mix one after another of the different mixtures and dump the weighed batches one after another into the truck which has been positioned under a pug gate 38 over the station 22, the skip being kept away from the station 22 during this operation. Then, after the truck is loaded with the different or special mixture, it is driven away from the station and operation of the plant 24 to supply one of the standard mixtures to the skip 34 is resumed. Thus, the system is very flexible to supply a wide variety of mixtures rapidly, a load of either of the standard mixtures being supplied in a fraction of one minute at the station 26, while a load of any desired different or special mixture can be mixed and supplied in from three to five minutes. Consequently, very rapid delivery of the standard mixtures is effected while trucks requiring the special mixtures can be supplied quickly at the station 22 and without interrupting the loading at the station 26.

The skip 34 (FIGS. 1 to 4) is open at its top and front end and includes a pair of sides 50, a bottom 52 having an upturned, forwardly positioned lip 54 and a rear or back wall 56. A pair of flanged rollers 58 (FIGS. 2 and 3) are mounted on a shaft 60 journaled in radial-and-thrust bearings 62 carried by the sides 50 and serving to brace the sides 50. End portions 66 of the shaft space the rollers 58 outwardly from the sides 50 and the rollers extend into and are supported by oppositely facing, parallel, channel-like elevating tracks 68 having lower, horizontal portions 69 at a level above the uppermost portion of the truck 20. At the upper, rear corner portions of the sides 50, a pair of flanged rear rollers 70 are similarly mounted by a shaft 71 (FIG. 2), identical with the shaft 60, bearings like the bearings 62 and a cylindrical housing 73 (FIG. 2). Aligned dump wheels or bridging rollers 72 are mounted by stub shafts 75 at the rear portions of the sides 50 and a substantial distance below the rear rollers 70. As best shown in FIG. 3, the rollers 72 are positioned close to the sides 50 and completely inside the innermost portions of the tracks 68 so as to be movable freely therebetween.

Ends of a pair of load or elevating cables 80 (FIGS. 1 and 4) are fixed by snubber anchors 82 to the cylindrical housing 73 at the upper end of the rear wall 56 of the skip 34, and the other ends of the cables 80 are secured to a pair of outer drums 84 keyed to a shaft 86 of a cable drive 88, the shaft being journaled by bearings 90 carried by a frame 92 of the drive and being driven by a double-chain drive coupling device 94 driven by a gear reduction unit 96 driven by a reversible electric motor 98 mounted on a base 100. A shaft 102 of the gear reduction unit 96 carries a brake drum 104 positioned between brake shoes 106 which are spring biased strongly toward braking positions locking the shaft 102, the gear reduction unit and the shaft 86 against rotation. An air pressure cylinder 108 may be actuated to move the shoes 106 to releasing positions. The cables 80 extend from the drum above and along lower portions 110 of the tracks 68, under sheaves 112 mounted on a shaft 113 journaled in bearings 115 mounted on the tracks, above and along inclined or elevator portions 114 of the tracks, around sheaves 116 at the upper ends of the tracks, and along the upper edges of the tracks and around the cylindrical housing 73 at the top of the rear wall 56 of the skip 34, the cables 80, when the skip is in its loading position, extending under cable hold-down rollers 118 mounted by brackets 120 secured to curved transition portions 122 of the tracks in positions extending above and across the tracks. The courses of the cables 80 from the anchors 82 to the sheaves 116 are inside the sheaves 112.

Two haulback cables 130 (FIGS. 1 and 4) secured at one end to inner drums 132 keyed to the shaft 86 extend from the drums 132 downwardly and under cable tensioners 134, under the rollers 118 and around the cylindrical housing 73 to anchors 136 on the housing 73. The drums 132 are of the same diameter as that of the drums 84. Inverted U-shaped bridges 135 brace the tracks 68, posts 136 support the upper ends of the tracks on the tops of the surge tanks 32 and braces 138 are secured to the tracks and the posts to form rigid triangles therewith.

The motor 98 may be energized to drive in either direction and the cylinder 108 actuated to release the brake shoes 106 to move the skip 34 to any desired position between a loading position (FIG. 2) under the pug gate 38 and a dumping position (FIG. 5) at the upper end of the tracks 68, the skip being shown in FIG. 1 in an intermediate position out of the way of any truck 20 at the loading station 22. The motor 98 is so wired that when the electric power thereto is cut off, dynamic braking of the cable drive is applied. Also, the pneumatic cylinder 108 is de-activated to permit the shoes 106 to be spring-pressed strongly against the drum 104 whenever drive of the motor is stopped. Thus, a double braking action on the cable drums controlling the skip 34 is effected.

After the skip 34 is loaded under the plant 24, the operator actuates the motor 98 and the cables 80 advance the skip from the plant along the tracks 68 to the dumping position (FIG. 5) of the skip. As the skip approaches the dumping position, the front rollers 58 travel through gaps 140 in lower flanges 142 of the tracks 68 and move into horizontal, branch or dumping tracks 144. The rear rollers 70 continue to rise and the skip is turned clockwise, as viewed in FIG. 5, until it reaches the extreme dumping position thereof which is shown in FIG. 5. Just before the rollers 70 reach the gaps 140, the bridging rollers 72 move onto and roll along bridging or dumping tracks 145 having tapered entrance portions 146. The rollers 72 rest on the tracks 145 and support the rear end of the skip at least until the rollers 70 have traveled past the gaps 140 and onto flanges 148 of extreme upper portions of the tracks 68. The bridging tracks are so inclined relative to the portions 114 of the tracks 68 and 144 and the rollers 70 and 72 are so positioned relative to each other and the rollers 58 that the rollers 72 are substantially in contact with the flanges 142 and 148 as the rollers 70 approach the gaps 140 and immediately after crossing the gaps 140. As the skip is turned from its normal position parallel to the tracks 68 to its dumping position, the end portions of the elevating cables 80 partially unwind from the cylindrical housing 73 and the end portions of the cables 130 are wound further onto the housing 73.

When the skip 34 is moved back from the dumping position thereof, the rollers 70 move back along the extreme upper portions of the tracks 68 and the skip is swung counterclockwise until the rollers 72 move onto the tracks 145. Then the rollers 70 move to and across the gaps 140 while the rollers 72 and tracks 145 support the rear end of the skip. Then the rollers 70 engage the flanges 142 below the gaps 140 and support the rear end of the skip. On further travel, the rollers 58 move through the gaps 140 and into the tracks 68 and are supported thereby. The rollers 72 are spaced completely inside the pairs of tracks 68 and 144 so as to be freely movable therebetween as the skip is swung to and from its dumping position. Posts 152 support the plant 24 in its elevated position above the path of the trucks 20 at the station 22 and also support the lower ends of the tracks 68.

The chute 36 (FIGS. 1 and 5) is mounted at the lower, discharge end of a funnel-shaped receiving apron 160, and is pivotal on a shaft 162 between a position discharging into one of the tanks 32 and a second position discharging into the other tank 32. The chute is positioned by an actuator, such as, for example, a solenoid or a pneumatic cylinder, under the remote control of the operator. The apron 160 has a lower, funnel portion 163 extending under the front end of the skip when the skip is in its dumping position, and has sidewalls 164 and a rear wall 166 extending above most of the open front end of the skip, as best shown in FIG. 5.

In the operation of the apparatus, the operator closes toggle switch 180 (FIG. 6) in a control powerline 182 deriving power from a three-phase powerline 184, and power is supplied to control circuit 186 and a solenoid 188 which controls the position of a gate (not shown) controlling movement of the traffic to permit a truck to move to the plant for loading. For automatic operation, when the skip 34 is in the loading posiiton under the plant 24, a toggle switch 190 is closed manually and, the skip being in engagement with a limit switch 192 in parallel with a manually operable, momentary switch 194 open at this time, a timer 196 is energized. The timer 196 immediately closes contacts 198 to energize pug gate solenoid 200 to open the pug gate 38 and a batch is dropped from the plant into the skip. The timer 196 at its start also first opens contacts 202 and then closes contacts 204 to energize a relay winding 206 which closes holding contacts 208 and contacts 210, which set up a circuit to a relay winding 212. The timer 196, after a time sufficient for the batch to have dropped into the skip, times out to open its contacts 198 and 204 and close contacts 202. Opening of contacts 198 drops out the solenoid 200 and the pug gate is closed by a spring-operated valve controlling a standard hydraulic actuator (not shown) of the pug gate. As the pug gate is closed, it actuates a limit switch 214 to energize relay winding 220, a manually operable switch 216 having been set by the operator in either its automatic or semi-automatic position in which contacts 218 are closed. The winding 220 locks in through holding contacts 222 and closes contacts 224 to energize "up" pilot light 226 and relay winding 228. The relay winding 228 opens contacts 230 and 232 and closes contacts 234, to start the motor 98 to haul the skip from the plant toward the surge tanks, and closes contacts 236 to energize a solenoid 238, which actuates the cylinder 108 to release the brake shoes 106. The plant 24 starts to compound and mix another batch when the pug gate is closed.

When the skip 34 arrives at its dumping position (FIG. 5), it engages limit switches 240 and 242 on the tracks 68 to open contacts 244 and 246 to drop out relay windings 206, 220 and 228 and close contacts 248 and 250 to start a timer 252. The de-energization of the relay winding 228 opens the contacts 236 to de-energize solenoid winding 238 to cause the brake shoes 106 to lock the skip in its dumping position. When the timer 252 times out, after a time sufficient for the skip to have dumped completely, it closes contacts 254 to energize relay winding 256, the switch 216 being in its automatic or semi-automatic position and having contacts 258 closed. The relay winding 256 opens blocking contacts 260, and closes contacts 262, 264, 266 and 268. Closing of the contacts 262 starts an electronic timer winding 270 to close contacts 272, the contacts 260 having opened before the contacts 262 were closed to prevent relay winding 274 from being energized at this time. Closing of the contacts 266 locks in the winding 256, and closing of the contacts 268 causes energization of relay winding 276, which closes holding contacts 278 and closes contacts 280 to energize the brake solenoid winding 188 to release the brake shoes 106, contacts 279 of the switch 216 being closed. Closing of the contacts 264 energizes a pilot light 281 and a relay winding 282, which opens blocking contacts 284 and closes contacts 286 in parallel with the contacts 280. Energization of the relay winding 282 also closes "down" contacts 288 to energize the motor 98 in a direction hauling the skip back down toward the plant.

As the downward moving skip 34 approaches its loading position under the plant, the skip actuates and opens limit switch 300. Opening of the limit switch 300 drops out the relay windings 256 and 282 to open the contacts 288, 262, to start dynamic brake timer winding 270 to close contacts 272, and close contacts 260 to energize winding 274, which closes contacts 310 and 312 to apply dynamic braking to the polyphase motor 98 by applying D.C. current to one of its windings. The dynamic braking starts gradually, comes to a maximum of 200% of the normal torque of the motor and then drops to zero as the motor comes to a stop. When the relay winding 256 is dropped out, the contacts 262 open to start the timer 270, which is set at about three seconds, and the contacts 260 close to cause energization of the relay winding 274 which closes contacts 310, 311 and 312 in a dynamic braking circuit 314 including a rectifier 316 and a stepdown transformer 318. The closing of the contacts 310, 311 and 312 causes sufficient dynamic braking power to be supplied to the motor 98 to stop the skip. The timer including the winding 270 then times out and the winding 270 is de-energized to open contacts 272 which drops out relay winding 274 to remove dynamic braking from the motor. The timer circuitry to the winding 270 times out, after the motor has stopped, to drop out the winding 270, which drops out the winding 274. As the motor is stopping the skip, the skip opens limit switch 302 which would be effective to actuate the dynamic braking just described if the limit switch 300 should have failed to open for any reason. The opening of the switch 302 also drops out relay winding 276 to close the contacts 280 to actuate the mechanical brake actuating solenoid winding 238 to apply the brake shoes 106 to the cable drive and locks the skip in its loading position. The dynamic braking normally stops the skip and the brake shoes hold the skip normally. However, if the dynamic braking should ever be ineffective, for any reason, to stop the skip, the brake shoes do so. The skip when in its loading position also actuates limit switch 320 to open contacts 322 to act as insurance in the event that the limit switches 300 and 302 should, for any reason, fail to be opened by the skip. The limit switch 320 also closes contacts 324 to actuate the gate solenoid winding 200 to keep the gate closed while the skip is in its loading position.

The operation described above then is repeated to receive and take another batch of the standard mixture from the plant to the surge tank receiving it, the limit switch 192 being reclosed when the skip is in its loading position. A manually operable, momentary switch 322 may be closed to move the skip up as described when the switch 216 is in its automatic or semi-automatic position with contacts 324 closed. Similarly, a manually operable, momentary switch 326 is closed to run the skip downwardly, contacts 328 of the switch 216 being closed. The switches 322 and 326 may be used to override the automatic operation and position the skip in its retracted position out from under the plant and out of the path of the truck. A manually operable emergency stop switch 330 is provided for quickly stopping the skip, the stopping occurring in about two feet of travel of the skip.

The pug mill gate of the plant 24 is at the bottom of the plant and is adapted to dump its contents at a level just above the portions 69 of the tracks 68 and between the portions 69, such dumping being either to a truck or to the skip 34. The portions 69 are just above the path of trucks to be loaded which permits the pug mill gate to be as low as possible and still clear the path of the trucks. This makes as short as possible the distance which the mixture is dropped to the truck. The cables and tracks are outside the dumping path from the pug mill gate.

The above-described asphalt preparing and delivering system serves to build up reserves of standard or heavy running mixtures in the insulated surge tanks and rapidly loads trucks with these mixtures. Also, the plant can make a full sized batch of either standard mixture regardless of sizes of trucks being loaded by the surge tanks. The system also rapidly supplies special mixtures directly from the plant, and with the reserves accumulated in the surge tanks, formulation, mixing and loading of the special mixtures at the plant do not interrupt loading of trucks at the surge tanks, which can be effected concurrently with loading of a truck at the plant. The skip 34 is underslung so that the portions 69 of the tracks 68 can be located in elevated positions out of the path of any truck at the loading station under the plant and permits the position of the pug gate to be low. The simplicity of the construction of the skip and the dumping mechanism provides longevity and minimizes maintenance. The skip 34 is moved easily from its upright loading and carrying position to its tilted dumping position without any movable mechanism other than the moving skip itself and the cables. Both mechanical and dynamic braking are effected to insure stopping the skip at any selected point. The drive of the skip is by two cables in each direction and the cable hoist is driven by two chains so that even if one should break the skip is still under the full control of the other.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In an asphalt preparing and delivering system, mixing means,
a first loading station positioned below the mixing means,
storage means spaced away from the mixing means and the first loading station,
a second loading station positioned below the storage means,
and conveyor means normally operable to receive asphalt material from the mixing means and deliver the material to the storage means and adapted to be placed in a non-operating condition while a truck is at the first loading station, the conveyor means including a track extending from the bottom of the mixing means to the storage means, a skip bucket movable along the track and moving means for moving the bucket along the track.

2. The asphalt preparing and delivering system of claim 1 wherein the track means includes a first portion under the mixing means and above a truck at the first loading station, a dump portion at the storage means and a third portion extending from the first portion to the third portion,
the moving means being adapted to selectively stop the skip bucket in a loading position on the first portion of the track means, in a dumping position on the dumping portion of the track and in an idle position on the third portion of the track.

3. The asphalt preparing and delivering system of claim 1 wherein the third portion of the track means is inclined upwardly from the first portion and the dumping portion of the track means is above the storage means.

4. The asphalt preparing and delivering system of claim 3 wherein the moving means includes a capstan-like connector member secured to the skip bucket, a pulling cable having an end portion extending at least partly around the connector member in one direction and fixed to the connector member and a haulback cable having an end portion extending at least partly around the connector member in the other direction and fixed to the connector member.

5. The asphalt preparing and delivering system of claim 1 wherein the dump portion of the track means includes an inclined portion having a gap therein and a branch extending angularly from the gap,
the skip bucket including first roller means at the front end thereof adapted to travel along the track means to the gap, pass through the gap and travel along the branch,
the skip also including second roller means on the skip bucket and spaced rearwardly from the first roller means and adapted to travel along the track means,
and guide means for preventing movement of the second roller means through the gap.

6. The asphalt preparing and delivering system of claim 5 wherein the guide means includes third roller means on the skip bucket, and bridging track means adapted to support the third roller means while the second roller means is adjacent the gap.

7. The asphalt preparing and delivering system of claim 1 wherein the moving means includes a capstan, a pulling cable secured to the capstan and the skip bucket, electric motor means for driving the capstan, and circuit means for slowing the skip bucket by dynamic braking action.

8. The asphalt preparing and delivering system of claim 7 including second brake means for frictionally braking the capstan, and means for sequentially actuating the circuit means to brake the skip and the second brake means.

9. The asphalt preparing and delivering system of claim 1 including a plurality of rollers mounted on the upper portion of and carrying the skip bucket and movable along the track means.

10. The asphalt preparing and delivering system of claim 1 wherein the track means includes a pair of tracks spaced a predetermined distance apart and having branches at the upper ends thereof,
a front pair of rollers mounted on the upper forward portions of the sides of the skip bucket and riding in the tracks and adapted to pass into the branches,
a rear pair of rollers mounted on the upper rear portions of the sides of the skip bucket and riding in the tracks,
a third pair of rollers mounted on the sides of the skip bucket and adapted to pass between the branches,
and a third pair of tracks for supporting the third pair of rollers while the first pair of rollers is in the branches and inclined to the branches to cause the bucket to tilt and dump as the first rollers travel along the branches.

11. A pair of inclined, channel-like main tracks spaced a predetermined distance apart and each having a gap in the lower side thereof and intermediate its ends,
a pair of branch tracks extending from the gaps and more nearly horizontal than the main tracks,
a skip bucket having an upper discharge opening,
a pair of rear roller means carrying the rear end of the bucket and adapted to travel along the main tracks,
a pair of front roller means adapted to travel sequentially along the main tracks and the branch tracks as the bucket is moved upwardly and the rear roller means travels along the main tracks to tilt the bucket to a dumping position,
and moving means for moving the bucket along the tracks.

12. The asphalt preparing and delivering system of claim 11 wherein the rear roller means includes a pair of aligned upper rollers extending into the main tracks and a pair of aligned lower rollers spaced inwardly from the upper rollers so as to pass between the branch tracks, and a pair of bridging tracks positioned inwardly from the main and branch tracks and adapted to be engaged by and support the lower rollers as the upper rollers approach and go past the gaps in the main tracks.

13. The asphalt preparing and delivering system of claim 12 wherein the moving means includes:
a cable,
means guiding the cable along the tracks and forwardly from the bucket,
means attaching the cable pivotally to the upper, rear portion of the bucket,
and means for taking up and letting out the cable.

14. The asphalt preparing and delivering system of claim 11 wherein the moving means includes:
a cable,
means guiding the cable along the tracks and forwardly from the bucket,
connector means attaching the cable pivotally to the upper, rear portion of the bucket,
and means for taking up and letting out the cable.

15. The asphalt preparing and delivering system of claim 14 wherein the connector means includes:
a capstan-like connector member secured to the upper, rear portion of the bucket,
and means fastening the cable to the connector member in a position in which the end portion of the cable extends at least partially around the connector member.

References Cited

UNITED STATES PATENTS

| | | | |
|---|---|---|---|
| 2,746,733 | 5/1956 | Edgerton | 259—147 |
| 3,182,859 | 5/1965 | Harris | 222—132 |
| 3,304,065 | 2/1967 | Eaton | 259—154 |
| 3,305,138 | 2/1967 | Plumb | 259—151 X |

ROBERT W. JENKINS, *Primary Examiner.*

Disclaimer 3,415,499.—*Glenn W. Ebert*, Eugene, Oreg. ASPHALT PREPARING AND DELIVERING SYSTEM. Patent dated Dec. 10, 1968. Disclaimer filed Dec. 2, 1968, by the assignee, *McKenzie Sand & Gravel Co.*

Hereby enters this disclaimer to claims 4, 5, 11 and 18 of said patent.

[*Official Gazette April 29, 1969.*]

Corrected Disclaimer

3,415,499.—*Glenn W. Ebert*, Eugene, Oreg. ASPHALT PREPARING AND DELIVERING SYSTEM. Patent dated Dec. 10, 1968. Disclaimer filed Dec. 2, 1968, by the assignee, *McKenzie Sand & Gravel Co.*
 Hereby enters this disclaimer to claims 1, 2, 3, and 9 of said patent.
 This disclaimer supersedes the disclaimer issued April 29, 1969.
 [*Official Gazette July 29, 1969*].